United States Patent Office 2,731,495
Patented Jan. 17, 1956

2,731,495

PRODUCTION OF SEBACIC ACID

Robert Steele Emslie, Wilmington, Del., assignor to E. I. du Pont de Nemours and Company, Wilmington, Del., a corporation of Delaware No Drawing. Application August 13, 1951,
Serial No. 241,703

8 Claims. (Cl. 260—537)

This invention relates to the production of sebacic acid from its impure salts and more particularly to the recovery and purification of sebacic acid from the product obtained by alkaline pyrolysis of castor oil or castor oil acids.

Sebacic acid or octamethylene dicarboxylic acid having the formula $HOOC(CH_2)_8COOH$ is an important intermediate in the manufacture of plastics and plasticizers and for the preparation of certain polyamides and esters. Its principal source in commercial manufacture is from ricinoleic compounds, particularly castor oil or castor oil acids, of which the major constituent is ricinoleic acid or its derivatives. The castor oil is usually saponified and the resulting alkali salts or soaps are then acidified to produce mixed castor oil acids and free glycerin, which latter is then removed. The mixture of acids contains approximately 85% ricinoleic acid together with minor quantities of oleic, linoleic, stearic, dihydroxy stearic acids, and the like. It is this ricinoleic acid constituent which can be chemically reacted to prepare sebacic acid or its salts.

In such preparation, direct conversion of the acid to sebacic acid or its salts, octanol-2, octanone, etc., can be effected by alkaline pyrolysis or heat decomposition in the presence of a strong alkali such as sodium or potassium hydroxide. Alternatively, the acid can first be saponified to form a ricinoleate soap which can then be pyrolyzed with caustic soda or caustic potash. The ricinoleate is then decomposed or split to form the sebacate and octanol-2 through heating with additional alkali. The reactions involved in the general methods referred to are represented by the following equations:

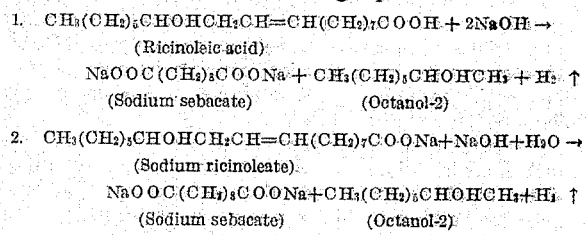

If castor oil itself is employed instead of ricinoleic acid or mixed castor oil acids, the ricinoleic material appears as glycerol ricinoleate.

The sebacate salt which is obtained can then be converted to sebacic acid by acidification and in accordance with, for example, the following equation:

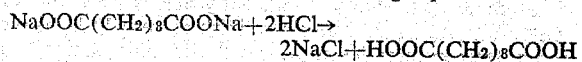

The sebacate salt product from the alkaline pyrolysis must be converted to sebacic acid and the product suitably purified. Hydrogen and octanol-2, shown in the simplified equations above, can be readily removed because separable as gases. However, since the use of pure ricinoleic acid as a reactant is not resorted to because it is highly uneconomical and impractical and since recourse is had to castor oil or castor oil acids, the sebacic acid product must be separated from the various fatty acid and other contaminating constituents present in such substances.

Heretofore, separation and purification of the sebacic acid product has proved very difficult and considerable loss in sebacic acid yield is encountered in the recovery and purification operations. The usual procedure has been to prepare an aqueous solution of the crude pyrolysis product and then add an acid thereto until liberation of the contaminating fatty acids is effected. These contaminants appear as a liquid phase floating on the water solution and are removed through decantation. The water phase is then acidified further until sebacic acid precipitates as a crystalline solid. While this method is theoretically attractive because the various other fatty acids generally become insoluble in the water under much less acid conditions than are necessary to insolubilize sebacic acid, it is disadvantageous practically because the product requires further purification treatments, including recrystallization, solvent extraction, etc. A particularly undesirable disadvantage of the process resides in the considerable quantity of sebacic acid which is lost by absorption or solution in the liquid fatty acids at pH values near 6. For instance, even though the greater portion of such acids is removed at a relatively high pH, sufficient remain to provide an impure fatty-acids-containing material. In the course of recrystallization or other additional purification treatments required in prior methods, often about 5% more of sebacic acid is lost. If one should acidify further, for purposes of removing the fatty acids, undesirably an additional quantity of sebacic acid is lost because of its solubility in the fatty acid layer.

It is among the objects of this invention to overcome the above and other disadvantages of prior methods for recovering and purifying sebacic acid and to provide novel and effective processes for attaining such objects. A particular object is to provide a novel process for such purpose and which, in addition to obviating the disadvantages alluded to, will desirably afford a more efficient recovery in higher yields of a pure form of product. Other objects and advantages of the invention will be apparent from the ensuing description thereof.

These objects are attained in this invention which comprises dissolving in an aqueous medium an alkali sebacate fatty-acid-contaminated substance, initially acidifying the resulting solution to a pH ranging from about 6.0 to 7.5 to insolubilize the greater portion of fatty acid contaminants present, removing the separated insolubilized products from the aqueous system, further acidifying the aqueous phase to a pH ranging from about 4.7 to 6.0 to insolubilize remaining impurities, removing said impurities from the solution, and then acidifying the resulting filtrate to a pH below about 3.0 to precipitate and recover the pure sebacic acid as a crystalline solid.

In accordance with one specific adaptation of the invention, I dissolve in aqueous media such as water the crude sebacate product obtained from a conventional alkaline pyrolysis of castor oil acids or derivatives, or mixtures thereof. Preferably, an alkali sebacate obtained in accordance with the invention disclosed in the copending application of Frank W. Lane, Ser. No. 175,489, filed July 22, 1950 (now U. S. Patent No. 2,580,931), is subjected to such dissolution. In accordance with said invention, a ricinoleic-acid-containing compound such as castor oil is commingled with the stoichiometric excess of an alkali metal hydroxide, such as sodium hydroxide, to form a substantially non-fluid, saponified, solid mixture, and the resulting mass is then subjected to direct contact with superheated steam at temperatures ranging from about 200–415° C. and at substantially atmospheric pressure. The alkaline solution resulting from the dissolution of the crude sebacate product is then suitably acidified with a mineral acid such as sulfuric acid (or other acid stronger than sabacic acid itself) and until a pH of between 6.0 and 7.5 is reached. This first acidification step serves to liberate a large proportion of the fatty acid impurities existing in the pyrolysis product in the form of soaps. In this particular pH range, the alkali sebacate or sebacic acid soap remains essentially unaffected by the contemplated acidification treatment, while other undesired contaminants are converted to free acids and become insoluble in water. These insoluble contaminents are then separated from the sebacate solution, after which said solution is further acidified and with the same type of acidifying reagent but to a pH of between 4.7 and 6.0. In this second acidification step, liberation is effected of the remaining traces of residual contaminants in the sebacate, while the solution under treatment is maintained sufficiently alkaline to inhibit any material sebacic acid precipitation. The solution can then be suitably clarified as by the addition, if desired, of an inert absorbent such as activated charcoal, diatomaceous earth, alumina, or the like, adapted to convert the minute particles of insolubilized contaminants to a removable physical state. The material is then filtered, with or without the use of filter aid addition, and the resulting purified filtrate is then subjected to a final acidification and until sebacic acid precipitates out, which generally occurs at a pH of below about 3.0. This precipitate is then recovered and washed in a conventional manner to obtain the desired pure sebacic acid final product.

To a clearer understanding of the invention, the following specific example is given wherein parts indicated are by weight. This example is merely in illustration but not in limitation of the invention.

*Example*

Mixed castor oil acids containing about 85% by weight of ricinoleic acid were mixed with a stoichiometric excess of caustic soda to form a non-fluid mass, and the mixture pyrolyzed by direct contact with a moving stream of steam at atmospheric pressure, and at 320° C. for a period of 4 hours. The product of this alkaline pyrolysis comprised 542 parts of sodium sebacate, 331 parts of fatty acid soap contaminants, and 149 parts of free sodium hydroxide, a total of 1022 parts. This material was dissolved in 8500 parts of water and maintained at a temperature of 75° C. To the solution were added 295 parts of 75%-strength sulphuric acid, whereby the pH of the solution dropped to 6.5. Three hundred and eight parts of a fatty acid product were liberated at this point and rose to the top of the aqueous solution, forming an oily layer thereon. This top layer was withdrawn, and the remaining aqueous system, still maintained at a temperature of 75° C., was adjusted to pH 5.6 by the addition of 18 parts of 75% sulphuric acid. Eight parts of activated charcoal were added to absorb residual difficultly separable contaminants, and the system was filtered. The filtrate, heated to 90° C., was treated with 291 parts of 75% sulphuric acid, thereby reducing the pH to 2.5. Crystalline sebacic acid appeared in the water system and, after cooling, was filtered therefrom. The filter cake was washed with water to remove sodium sulphate and such other salts as may be present and then dried, whereupon 486 parts of pure sebacic acid were recovered. The yield of the acid thus recovered was 98% of that present in the crude hydrolysis product.

A portion of the same type of alkaline pyrolysis product was treated according to the usual art method by similar dissolution in water, acidification with sulphuric acid to pH 6.0, removal of the liberated fatty acids, and final acidification to pH 2.5. The yield of sebacic acid was only 95% of theoretical in this instance, and it was still contaminated so as to require recrystallization from water. After this recrystallization, final recovery was only 90% of theoretical.

Although the invention has been described as applied to certain specific embodiments, it will be understood that it is not restricted thereto and that variance therefrom can be resorted to without departing from its underlying principles and scope. Thus, although sulfuric acid comprises a preferred form of inorganic acidifying agent, essentially any type of acidifying medium which is stronger than sebacic acid itself can be utilized in the process. Because of their obvious advantages of cost and availability, I generally prefer to employ strong mineral acids such as sulphuric, hydrochloric, or nitric. If desired, other types of acids including acetic, chloroacetic, phosphoric, and the like, can be used. It will thus be understood that a wide variety of acid-reacting substances is contemplated for use in effecting the contemplated lowering of the pH of alkali sebacate solutions subjected to treatment herein.

The pH values given, however, are essential and critical in the invention since my novel results and beneficial effects accrue from the regulated, intermittent, and carefully controlled acidification treatments which are resorted to. In prior sebacic acid purifications, the crude alkali sebacate is first acidified to about pH 6, removing the liberated fatty acids, and a final one-step acidification from pH 6 to below pH 3 is effected. It is my discovery that the introduction of an intermediate acidification step avoids the loss of a considerable part of the sebacic acid yield which heretofore has necessarily occurred and in addition advantageously eliminates a second loss from the hitherto necessary step of recrystallization or other secondary purification. By introducing an intermediate acid treatment, I effect removal of residual contaminants under conditions whereby the sebacic acid itself is substantially untouched. Then, when the third acidification is resorted to, a markedly larger yield of a substantially purer sebacic acid product is advantageously obtained.

One generally carries out acid purification in an aqueous system. Alkali sebacate, as well as the other soaps generally contaminating a castor oil alkaline pyrolysis product, is highly soluble in water, so that there is generally no problem as to effecting solution thereof. As is generally true in physical chemistry, solubility may be increased by an elevated temperature and will depend on the type of the selected raw materials. When preparing sebacic acid commercially, the hot product is taken directly from the pyrolysis chamber and quenched in water, thus obtaining a relatively hot, aqueous solution, e. g., one at a temperature of from about 40° C. to 100° C. Additionally, the acidifying agent may be used in the form of an aqueous solution. Its strength is relatively unimportant, being governed only by the practical hazards found in adding acid to water. Obviously, the acid should not be so concentrated as to degrade by-product fatty acids, should their recovery be desired. In such instances, and for most practical commercial operations, I may prefer to employ acid solutions ranging up to, say, about 50% strength.

It is often desirable to keep the sebacate solution warm during acidification. As already mentioned, solubility of the alkali sebacate and other soaps may be thereby increased, although this is seldom a problem; but the main reason for so doing is to facilitate removal of the liberated contaminants as acidification proceeds. Preferably, also, the solution is kept warm during the second acid treatment wherein residual, more difficultly removable materials are insolubilized, the sebacic acid being maintained in solution at high concentrations under these conditions. Some of the fatty acid constituents of castor oil and its derivatives solidify at very little below room temperature; hence, one can maintain them as a liquid phase and more easily separate them from the water phase by simple decantation, if the temperature of the mass is at least about 20° C. However, generally heating to substantially above 100° C. is avoided so that evaporation of the water will not occur; in many instances such boiling is unimportant, but sometimes it may affect the solubility of the alkali sebacate or sebacic acid. It is obvious that the particular temperature chosen may well be interdependent with the particular pyrolysis product being purified, the types of fatty acid contaminants present, the particular acidification step and pH range involved, the sebacic acid or sebacate content of the solution, and the like.

Frequently, it will be found preferable to operate with an aqueous solution containing sebacate equivalent to between about 25 and 75 grams per liter of sebacic acid. When operating within this range, a wide range of temperature can be used during the first acidification step, although heat can be applied or withdrawn (depending upon the method of acid addition) to maintain a temperature range of between 40° C. and 100° C., and particularly between 60° C. and 80° C. During the second acid treatment after decantation of the major contaminants, the temperature can be successfully maintained at between 20° C. and 100° C., or more, and usually between 40° C. and 100° C. as in the first step, or, more preferably, between 60° C. and 90° C. In the third acid treatment, where the solution has been already purified and it is desired to insolubilize the sebacic acid anyway, any suitable temperature can be used.

The particular means employed to remove the various contaminants liberated during the acidifications are not critical. Simple decantation of fatty acids can be resorted to where these appear as liquid immiscible with the water system. If desired, an absorbent such as activated charcoal can be resorted to for purposes of aiding the clarification of the solution, and the insoluble solid impurities filtered out. Obviously, any conventional procedures or equipment can be utilized without departing from the invention. Likewise, the particular method chosen for recovery of the finally precipitated, pure sebacic acid product is non-critical. Its separation from the water system can be effected by any means known to those skilled in the art, after which it can be processed or packaged in any desired manner.

It is apparent from the foregoing that my invention provides a novel, relatively simple but surprisingly efficient method for recovering and purifying sebacic acid from the usual crude alkali sebacate contaminated with fatty acid derivatives obtained from alkaline pyrolysis or fusion with strong alkali of ricinoleic compounds, especially castor oil or castor oil acids, in accordance with, for example, the methods disclosed in said copending Lane applications Ser. No. 175,489 or U. S. Patents Nos. 2,318,762, 2,182,056, 2,217,516, etc., also, that one is enabled to obtain a substantially higher yield and a purer form of product than has heretofore been possible. On an equal quality basis, my new method affords a considerable decrease in operating cost since the very simple intermediate acidification step advantageously replaces the costly prior art step of recrystallization.

I claim as my invention:

1. A process for obtaining pure sebacic acid from an impure alkali sebacate comprising initially acidifying an aqueous alkaline solution of said sebacate to a pH ranging from 6 to 7.5, removing from the solution liberated fatty acid product resulting from said initial acidification, further acidifying the resulting, partially purified solution to a pH ranging from 4.7 to 6, removing therefrom organic contaminants formed as a result of said further acidification, and then acidifying the solution obtained as a result of said organic contaminant removal to a pH of below about 3 and recovering the sebacic acid product which becomes liberated.

2. A process for recovering pure sebacic acid from an alkali metal sebacate which comprises incorporating a mineral acid in an aqueous alkaline solution of said sebacate until the pH of said solution is within a 6 to 7.5 range, separating from the aqueous phase insolubilized fatty acid product thereby liberated, thereafter incorporating in said aqueous phase an additional amount of said mineral acid until the pH thereof is within a 4.7 to 6 range, removing therefrom organic contaminants thereby separated from the solution, further acidifying said solution by incorporating further quantities of said acid therein and until a pH of below about 3 is reached, and then recovering the resulting crystallized sebacic acid product.

3. A process for recovering pure sebacic acid from impure sodium sebacate which comprises mixing a mineral acid with an aqueous alkaline solution of said sebacate until the pH of said solution is within a range of 6 to 7.5, removing therefrom the fatty acid product which is thereby liberated, thereafter mixing a further quantity of said acid with said solution and until its pH is within a range of 4.7 to 6, removing from the solution organic contaminants formed therein, further acidifying the solution by mixing additional amounts of said acid therewith and until a pH of below about 3 is reached, and then recovering the crystallized sebacic acid thereby liberated.

4. A process for recovering pure sebacic acid from impure potassium sebacate which comprises mixing a mineral acid with an aqueous alkaline solution of said sebacate until the pH of said solution is within a range of 6 to 7.5, removing therefrom the fatty acid product which is thereby liberated, thereafter mixing a further quantity of said acid with said solution and until its pH is within a range of 4.7 to 6, removing from the solution organic contaminants formed therein, further acidifying the solution by mixing additional amounts of said acid therewith and until a pH of below about 3 is reached, and then recovering the crystallized sebacic acid thereby liberated.

5. A process for the recovery of pure sebacic acid from impure sodium sebacate which comprises adding sulphuric acid to an aqueous solution of said sebacate until its pH is within the range 6 to 7.5, removing from the solution the fatty acid product which is thereby liberated, thereafter adding additional sulfuric acid to the solution under treatment and until the pH thereof is within the range 4.7 to 6, removing the organic contaminants which form and separate therein as a result of said additional sulfuric acid addition, thereupon adding a further amount of sulfuric acid to the partially purified solution and until its pH is reduced to below about 3, recovering the crystallized sebacic acid product which thereby results and subjecting it to a washing treatment.

6. A process for the recovery of pure sebacic acid from impure sodium sebacate which comprises adding hydrochloric acid to an aqueous solution of said sebacate until its pH is within the range 6 to 7.5, removing from the solution the fatty acid product which is thereby liberated, thereafter adding additional hydrochloric acid to the solution under treatment and until the pH thereof is within the range 4.7 to 6, removing the organic contaminants which form and separate therein as a result of said additional hydrochloric acid addition, thereupon adding a further amount of hydrochloric acid to the partially purified solution and until its pH is reduced to below about 3, recovering the crystallized sebacic acid product which thereby results and subjecting it to a washing treatment.

7. The process for the recovery of pure sebacic acid from an alkali metal sebacate which comprises adding a mineral acid to an aqueous alkaline solution of the sebacate and until the pH of the solution is within the range 6 to 7.5, removing from the solution the fatty acid product which thereby becomes liberated therein, thereafter adding an additional amount of the mineral acid to the solution and until its pH is within the range 4.7 to 6, adding an absorbent material to the acidified solution, subjecting the resulting mixture to filtering to purify said solution, further acidifying the treated solution and to a pH of below about 3 by adding an additional amount of said mineral acid, and recovering and washing the sebacic acid product which is thereby liberated.

8. The process for the recovery of pure sebacic acid from impure sodium sebacate which comprises adding sulfuric acid to an aqueous alkaline solution of said sebacate and until its pH is within the range 6 to 7.5, removing the resulting fatty acid product which separates therein, thereupon adding a further amount of sulfuric acid to the treated solution and until its pH is within the range 4.7 to 6, adding an absorbent material thereto and subjecting the mixture to filtering to remove organic contaminants liberated therein from said further amount of sulfuric acid addition, thereupon acidifying the solution by means of sulfuric acid addition and until its pH is below about 3, and then recovering and washing the resulting crystallized sebacic acid product.

References Cited in the file of this patent

UNITED STATES PATENTS

| | | |
|---|---|---|
| 1,945,246 | Witzel | Jan. 30, 1934 |
| 2,182,056 | Bruson et al. | Dec. 5, 1939 |
| 2,217,516 | Houpt | Oct. 8, 1940 |
| 2,318,762 | Davis et al. | May 11, 1943 |
| 2,580,931 | Lane | June 1, 1952 |